United States Patent Office 2,953,437
Patented Sept. 20, 1960

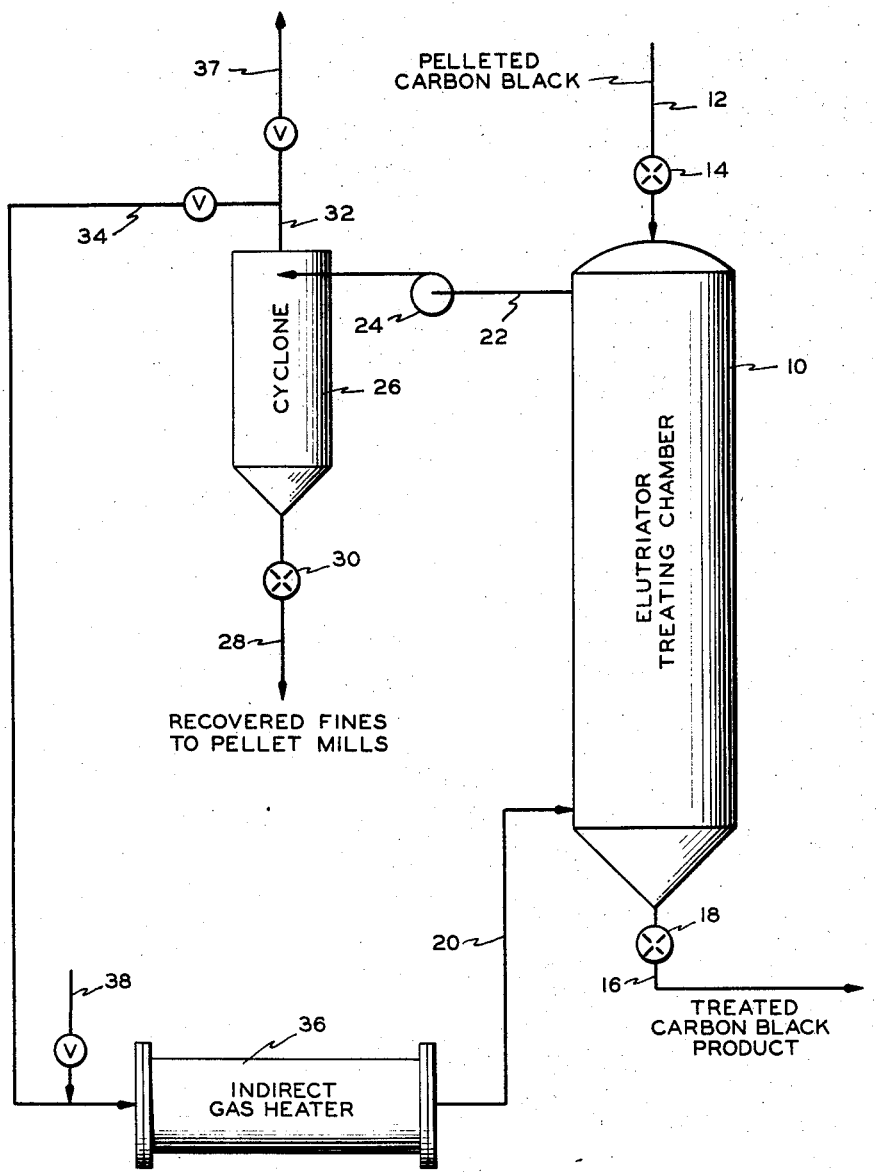

2,953,437
PROCESS FOR TREATING CARBON BLACK PELLETS

Alvin J. Andrews, Bartlesville, Okla., assignor to Phillips Petroleum Company, a corporation of Delaware Filed Dec. 21, 1956, Ser. No. 629,807

9 Claims. (Cl. 23—209.6)

This invention relates to a process for producing improved carbon black pellets.

The chief source of carbon black for compounding with rubber, principally for use in automobile tires, is from carbon black furnaces which produce so-called furnace black; however, there is still considerable production of channel black by the old channel black process. The various types of carbon black, including furnace black and channel black, are generally pelleted by either dry or wet pelleting processes to facilitate their handling and use.

In wet pelleting processes, water or aqueous solutions are introduced to the loose black to facilitate pelleting and in most of the processes utilizing water as a pelleting aid, the pellets formed in the pelleting mill are apparently dry even tho they contain up to 40 to 45% water based on the weight of the finished pellets. The usual specifications on pellets require a water content below about one weight percent of the pellets and it is therefore necessary to subject the pellets to a drying process. Drying processes for carbon black pellets frequently comprise contacting the pellets in a rotating tumbling drum, or in other agitated condition with hot gas so as to dry the pellets and purge the drying ambient of water vapor.

In dry pelleting processes, the dry flocculent carbon black is fed into a horizontally elongated rotating tumbling drum or mill commonly 8 feet in diameter by 48 feet in length, whereby the loose black is gradually formed into small pellets as it passes from the feed end of the mill to the delivery end thereof. In this type of process hot carbon black at temperatures in the range of 250° to 450° F. is in contact with air. In most wet and dry pelleting processes, the pellets are subjected to oxidizing conditions.

U.S. Patent 2,682,448 of M. R. Cines indicates a realization that contacting of carbon black pellets at elevated temperatures with a treating gas of reduced oxygen content (in the range of 2.5 to 10 percent by volume) improves the carbon black in some of its important rubber compound characteristics. I have devised a process for treating carbon black pellets at elevated temperatures in an ambient devoid of free oxygen which enhances the rubber compounding characteristics of the treated black. My process also simultaneously treats the black and removes fines therefrom.

Accordingly, it is an object of the invention to provide a process for producing improved carbon black pellets. Another object is to provide a process for simultaneously elutriating and treating carbon black pellets to improve pellet quality. A further object is to provide an improved process for treating carbon black pellets which reduces the fines content thereof, lowers modulus, increases conductivity and scorch time, and reduces moisture content without detrimental effect on abrasive wear or other properties of the black. It is also an object of the invention to provide a process which simultaneously elutriates a carbon black stream and "after treats" the black. Other objects of the invention will become apparent from the accompanying disclosure.

I have found that the quality of carbon black pellets made by either a dry or a wet pelleting process is improved by contacting the pelleted stream, containing fines, with a carbon black furnace off-gas for short periods of time under conditions which suspend the carbon black pellets in the treating gas and simultaneously entrain and carry off the fines. In accordance with the invention, a stream of carbon black pellets passing from a dry pelleting process or from the dryer of a wet pelleting process is gravitated thru an elongated elutriating zone in intimate and direct contact with a counter-current stream of off-gas at a temperature in the range of 500 to 1800° F., preferably at at least 900° F., so as to entrain and remove the fines while improving the quality of the pellets. The short treating time of the pellets with off-gas at elevated temperature has the effect of sweeping away oxygen and hydrogen combined with the black and also has the effect of "after treating" the black. In addition to removing fines from the pellets the treatment has the effect of lowering the modulus of high modulus blacks such as those made from heavy tar feed stocks. It also increases conductivity and scorch time and reduces residual water to well below the one percent maximum permitted in commercial pellets. The abrasive wear of the black and other rubber properties are not deleteriously affected.

A more complete understanding of the invention may be had by reference to the accompanying schematic drawing which shows one arrangement of apparatus suitable for effecting the process of the invention. Referring to the drawing, an elutriating chamber 10 is provided with a pellet inlet line 12 in its top section in which is positioned a flow control valve 14, such as a star or rotary valve. A pellet effluent line 16, provided with a similar flow control valve 18, leads from the bottom of the elutriator to produce storage or packaging. A treating gas inlet line 20 connects with a lower section of elutriator 10 and a gas effluent line 22, containing a blower 24, leads from an upper section of the elutriator into an upper section of a cyclone separator 26. This separator is provided with an outlet line 28 for solids in which is positioned a flow-control valve 30 and with a gaseous effluent line 32. Line 34 connects effluent line 32 with an indirect gas heater 36 and the outlet of this heater is connected with line 20. A valved bleed-off line 37 connects with effluent line 32, and a makeup gas line 38 also connects with line 34.

In the operation of the invention, pellets from a dry pelleting mill or from the dryer of a wet pelleting system are passed thru line 12 under the control of flow control valve 14 into the top of elutriator 10 where the pellets and carbon black fines are brought into contact with an up-flowing stream of hot off-gas from a carbon black furnace at a temperature in the range of 500 to 1800° F. and, preferably, at least 900° F. The pellets gravitate thru chamber 10 at impeded flow rates due to the tendency of the upflowing gas to suspend the pellets, and the fines are carried out of the chamber thru line 22. Pellets gravitating thru chamber 10 are recovered thru line 16 and are passed to storage or packaging after adequate cooling.

Effluent gas from an elutriator 10 carrying entrained and suspended fines is passed into cyclone separator 26 which recovers most of the fines and delivers them thru line 28 to suitable disposal. It is advantageous to pass the recovered fines back to the pelleting process from which the pellet stream in line 12 is obtained. Effluent gas from cyclone 26 passes thru lines 32, a portion being vented thru line 37 and any other desirable portion being recycled thru line 34 to heater 36 and back to elutriator 10 via line 20. Off-gas is introduced to the system via line 38 at any suitable point upstream of heater 36. In instances where hot off-gas of required temperature is available, such gas may be introduced directly to line 20 without passing thru the heater. Indirect heater 36 may be heated by any suitable means such as by burning a suitable fuel therein to heat the off-gas by indirect heat exchange or by circulating a hot heat exchange fluid therethru.

The off-gas from carbon black furnaces is of relatively constant and fixed composition. A typical off-gas composition is the following:

| Gas: | Vol. percent |
|---|---|
| $CO_2$ | 3.2 |
| CO | 7.0 |
| $H_2$ | 8.0 |
| $N_2$ | 40.3 |
| $CH_4$ | 0.5 |
| $C_2H_2$ | 0.5 |
| Argon | 0.5 |
| $H_2O$ | 40.0 |

The principal constituents of carbon black furnace off-gas are nitrogen and steam with minor amounts of $CO_2$, CO, and $H_2$. The very minor amounts of hydrocarbon and argon are believed to be immaterial in the treating process.

Elutriator 10 comprises a vertical cylindrical tank which may vary in length and diameter in accordance with the type of treatment to be given the pellets. Of course, the longer the tank the longer the treating time and the more severe the treatment given the pellets. The diameter of the tank may vary according to gas thruput required and the fines content to be removed from the carbon black. When temperatures above about 1200° F. are utilized in elutriator 10, this vessel is lined with refractory material and cyclone 26 is similarly lined. Temperatures of this order require high temperature alloy equipment which comes in contact with the hot gases.

In one application of the invention 1000 pounds of pellets and fines are fed per hour into the upper end of an elutriator 2 feet in diameter and 10 feet long. Off-gas at a temperature of 1200° F. is passed upwardly thru elutriator 10 at a velocity of about 4 feet per second. Carbon black particles of 100 mesh and finer are removed from the pellet stream and most of this material is recovered in cyclone separator 26. The residence time of the pellets in elutriator 10 is in the range of 3 to 4 seconds. The treating of the pellets in this manner removes the fines and "after treats" the black, sweeping away oxygen, hydrogen, and water from the black leaving it substantially free of water. The "after treating" performed in this process is similar in effects to "after treating" of the black in the manufacturing process by extending the contact time of the black with the off-gas (hot furnace effluent) before quenching.

A furnace black (designated "A") in commercial production had a Mooney scorch time of 21 minutes at 250° F. and moduli of 1250, 1590, and 1700 pounds per square inch at 20, 40, and 50 minutes' cure time, respectively, at 280° F. and 300% elongation.

Furnace black (designated "B") from the same commercial plant, subjected to a short "after treating" in the hot furnace off-gas had a Mooney scorch time of 28 minutes at 250° F. and moduli of 1060, 1540, and 1610 pounds per square inch at 20, 40 and 50 minutes' cure time, respectively, at 280° F. and 300% elongation.

The short "after treatment" of furnace black was found to decrease the resistivity from 0.01270 to 0.00657 megohm/cm. (measurement made with 50 parts of black in natural rubber, 45 minutes' cure at 280° F.). This indicates an increase in conductivity.

Certain modifications of the invention will become apparent to those skilled in the art and the illustrative details disclosed are not to be construed as imposing unnecessary limitations on the invention.

I claim:

1. A process for treating a mixture of dry pelleted carbon black and fines to improve the quality of the black and separate the pellets from the fines which comprises introducing said mixture into the top of an elutriating zone; gravitating said mixture thru said elutriating zone in dry condition in direct contact with a countercurrent stream of treating gas comprising principally nitrogen and steam together with minor amounts of $CO_2$, CO, and $H_2$, but substantially devoid of free oxygen, at a temperature in the range of 500 to 1800° F. at a gas flow rate sufficient to entrain fines from said mixture but insufficient to maintain said pellets in suspension; removing treating gas, together with entrained fines, from an upper section of said zone; and removing improved pellets from a lower section of said zone.

2. The process of claim 1 wherein said gas is composed of off-gas from a furnace carbon black process.

3. The process of claim 1 wherein said contact is for a period of at least 2 seconds and not more than 4 seconds at a temperature of at least 900° F.

4. The process of claim 1 wherein said gas flow rate is regulated so as to separate 100 mesh and finer black particles from said pellets.

5. The process of claim 1 wherein said gas is separated from said fines; the recovered gas is reheated to a temperature in said range; and the reheated gas is recycled to said elutriation zone.

6. In a process for producing carbon black pellets of improved quality including the steps of forming carbon black in a furnace by incomplete combustion of a fluid hydrocarbon to form an effluent stream comprising carbon black and off-gas containing $N_2$, $H_2O$, $CO_2$, CO, and $H_2$, but substantially devoid of free oxygen; separating said carbon black from said stream of off-gas; and pelleting the carbon black, the improvement comprising gravitating the resulting pelleted carbon black in dry condition, containing a minor amount of fines, thru an elutriating zone in direct contact with a countercurrent stream of said off-gas for a period in the range of 2 to 4 seconds at a temperature in the range of 500 to 1800° F. so as to entrain said fines in said gas and heat said pellets to said temperature range, thereby improving the quality of said pellets; removing said gas and entrained fines from an upper section of said zone; and recovering said pellets from a lower section of said zone.

7. The process of claim 5 including the steps of recovering said fines from said gas and passing said fines to the pelleting step.

8. The process of claim 7 including the steps of reheating said gas to a temperature in said range, after recovery of said fines therefrom, and recycling same to said elutriation zone.

9. The process of claim 5 wherein said temperature is at least 900° F.

References Cited in the file of this patent

UNITED STATES PATENTS

| Re. 18,884 | Wiegand | June 27, 1933 |
| 2,479,708 | Amon | Aug. 23, 1949 |
| 2,511,088 | Whaley | June 13, 1950 |
| 2,621,034 | Stecker | Dec. 9, 1952 |
| 2,641,535 | Cines | June 9, 1953 |
| 2,643,182 | Williams | June 23, 1953 |
| 2,695,837 | Benz | Nov. 31, 1954 |
| 2,704,228 | Thayer | Mar. 16, 1955 |
| 2,766,880 | Schaub et al. | Oct. 16, 1956 |
| 2,864,674 | King | Dec. 16, 1958 |

FOREIGN PATENTS

| 670,980 | Great Britain | Apr. 30, 1952 |